US012478452B2

United States Patent
Mandelstam-Manor

(10) Patent No.: US 12,478,452 B2
(45) Date of Patent: Nov. 25, 2025

(54) APPARATUS AND METHOD FOR FREE-HAND TITRATABLE ILLUMINATION OF PHOTODISRUPTORS

(71) Applicant: Lumenis Be Ltd., Yokneam (IL)

(72) Inventor: Yair Mandelstam-Manor, Yokneam (IL)

(73) Assignee: LUMENIS BE LTD. (IL)

( * ) Notice: Subject to any disclaimer, the term of this patent is extended or adjusted under 35 U.S.C. 154(b) by 346 days.

(21) Appl. No.: 18/024,308

(22) PCT Filed: Sep. 16, 2021

(86) PCT No.: PCT/IB2021/058465
§ 371 (c)(1),
(2) Date: Mar. 2, 2023

(87) PCT Pub. No.: WO2022/058932
PCT Pub. Date: Mar. 24, 2022

(65) Prior Publication Data
US 2023/0329826 A1    Oct. 19, 2023

Related U.S. Application Data

(60) Provisional application No. 63/079,881, filed on Sep. 17, 2020.

(51) Int. Cl.
*A61B 90/30* (2016.01)
*A61F 9/008* (2006.01)

(52) U.S. Cl.
CPC .......... *A61B 90/30* (2016.02); *A61F 9/00825* (2013.01)

(58) Field of Classification Search
CPC ................ A61B 90/30; A61B 3/0008; A61B 2017/00203; A61B 2017/00216; A61B 2017/00973; A61B 90/25; A61F 9/008–2009/00897; G02B 21/06
See application file for complete search history.

(56) References Cited

U.S. PATENT DOCUMENTS

| 6,149,643 A * | 11/2000 | Herekar ............... A61F 9/00821 606/4 |
| 10,898,378 B2 * | 1/2021 | Plunkett .................. F21V 14/04 |
| 2019/0209371 A1 * | 7/2019 | Plunkett ............. G02B 26/0816 |

FOREIGN PATENT DOCUMENTS

| CN | 209122190 | 7/2019 |
| JP | 2016202431 | 12/2016 |
| WO | 2020086960 | 4/2020 |

OTHER PUBLICATIONS

Search Report and Written Opinion - corresponding PCT Application No. PCT/IB2021/058465, dated Jan. 7, 2022, 12 pages.

* cited by examiner

*Primary Examiner* — Jonathan T Kuo
(74) *Attorney, Agent, or Firm* — ISUS INTELLECTUAL PROPERTY PLLC; Anthony Jason Mirabito

(57) ABSTRACT

A movable illumination tower for use with a photodisruptor that provides titratable illumination of ocular tissue. The illumination tower can be rotated between an on-axis position relative to the photodisruptor axis and an off-axis position relative to the photodisruptor axis, such that the illumination tower is positioned at an angle relative to the photodisruptor axis under the control of a hands-free motor.

9 Claims, 9 Drawing Sheets

APPARATUS AND METHOD FOR FREE-HAND TITRATABLE ILLUMINATION OF PHOTODISRUPTORS

CROSS REFERENCE TO RELATED APPLICATIONS

This application is related to and claims priority to U.S. Provisional Application 63/079,881, entitled FREE-HAND TITRATABLE ILLUMINATION OF PHOTODISRUPTORS, filed Sep. 17, 2020, which is incorporated by reference herein in its entirety.

FIELD OF INVENTION

The present invention relates to the illumination of ocular tissue with photodisruptors.

BACKGROUND OF THE PRESENT INVENTION

In ophthalmology, YAG lasers are used to photo-disrupt, meaning using laser energy to create holes, cuts, openings, in ocular tissues, mainly in the anterior segment of the eye (the iris and the posterior capsule) and the vitreous. To visualize the tissue during the application of laser energy, the eye preferably may be illuminated. This is accomplished using an illumination tower, which is a component of the laser device which includes a source of light, which may be from a source that is not a laser light source. In one embodiment, it is positioned in the bottom/proximal of the device with one or more prisms or mirrors at the distal end, although any other arrangement to direct the light source is suitable. The beam of light coming from below is deflected by approximately 90 degrees, so as to project the illumination on the eye of the patient.

The illumination tower preferably is rotatable: It can be shifted from an on-axis position, in which the beam of light is generally parallel with the laser beam, to an off-axis oblique angle position, in which the beam of light may be directed from a side angle that is not on-axis. The illumination beam of light is not generally parallel to the laser beam, but rather shifted by up to about 40 or 45 degrees.

The ability to rotate the illumination tower is important since different illumination directions may reveal different features of the target tissue, here, the interior portions of the eye. These features may be relevant during a laser treatment or for planning a future laser treatment. A better view of these features may help the physician to properly select the treatment site and set other laser parameters for the treatment. A goal is to get the best view of a target tissue, including its topography, consistency or any anomaly, inhomogeneity or changes in the target tissue. Based on the shape or location of an anomaly, inhomogeneity or change in a tissue appearance, one or more treatment sites or any other treatment parameter may be selected.

In some cases, the user may achieve a better view when the illumination position is on-axis, while in other cases, a better view may be achieved by positioning the illumination source off-axis at various degrees from the on-axis position. On-axis illumination tends to create back scattered light which may mask some of the features of the tissue. In certain cases, in which detection of the topology and topography of the tissue surface is important, an off-axis illumination may provide a better view. Higher areas may shade some lower areas and the overall 3D view of the tissue surface may be seen. Providing such a 3D tissue surface image may help the physician to select the right treatment location e.g., when selecting a preferred site for an iridotomy procedure. Currently, the usual practice is for the physician/operator rotate the illumination tower with his/her hand, while the other hand holds a contact lens onto the eye of the patient. This means that during titratable illumination the physician cannot trigger a laser pulse.

The present invention is directed to an apparatus and method for improving the operation and functioning of photodisruptor devices.

SUMMARY OF THE PRESENT INVENTION

In an aspect, a movable illumination tower is configured for use with a photodisruptor; the photodisruptor has an axis along which energy from a first light source within the photodisruptor is directed to a patient's eye for treatment, including: a second source of illumination light energy positioned within the illumination tower, the second source of illumination light energy being configured to direct illumination of the patient's eye; a support for the illumination tower, the support being movable into and out of the photodisruptor axis; a motor to move the illumination tower into and out of the photodisruptor axis; and wherein the motor is configured to be operated by a hands-free control to move the illumination tower in and out of the photodisruptor axis.

In another aspect, the first light source is a source of coherent light, and the second source of light energy is a non-coherent light source. Further, the source of coherent light may be a laser light source and the hands-free motor control may be one or more of a: foot pedal, a voice-activated control or a head movement control.

In yet another aspect, the illumination tower may further include a source of power to power the motor, and a switch connected to the motor to control the provision of power to the motor. The tower may be rotatably mounted along an arm and configured to be moved in and out of the photodisruptor axis.

In yet a further aspect, the motor may be configured to adjustably rotate the illumination tower from along the photodisruptor axis to selected angles out of the photodisruptor axis.

In an aspect, a method of illuminating a patient's eye using the movable illumination tower includes: viewing a patient's eye through a binoculars along the photodisruptor axis; rotating the illumination tower driven by the motor to a first position relative to the photodisruptor axis by activating the hands-free control; assessing the illumination of patient's eye though the binoculars by rotating the illumination tower to one or more different positions in and out of the photodisruptor axis using the hands free switch.

In another aspect, the method includes the step of activating and directing the first light source within the photodisruptor to the patient's eye.

DETAILED DESCRIPTION OF THE PRESENT INVENTION

An aspect of the current invention is to motorize the rotation of an illumination tower, such that the illumination tower can be moved electronically. For example, the operator could shift the illumination tower with either the footswitch or even with a voice command. According to one embodiment, electrical current provided in one direction could rotate the illumination tower in an anti-clockwise direction, while electrical current provided in the other direction could rotate the illumination tower in a clockwise direction. The provision of a motor or other device to move the illumination tower allows the physician/operator to be able to operate the apparatus even while both of his/her hands are otherwise occupied.

Figure 1:
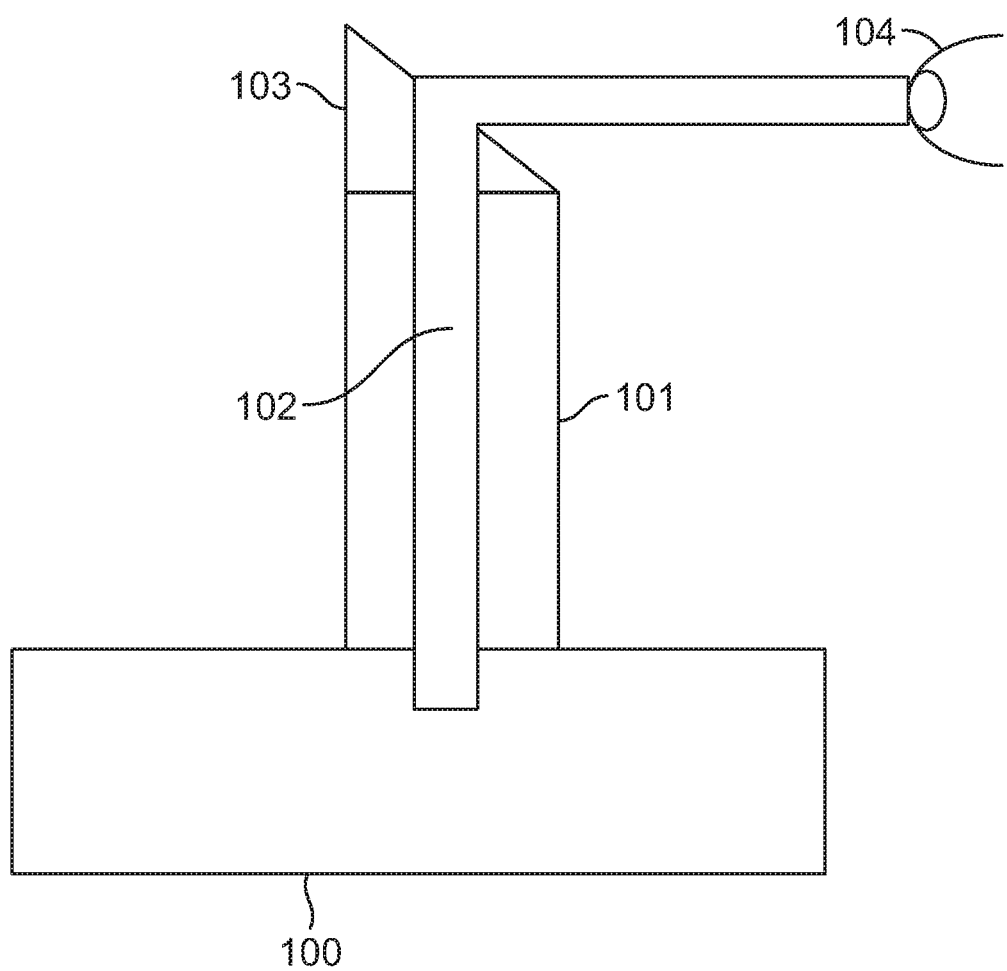
FIG. 1 is a side elevation view of an illumination tower.

FIG. 1. shows the illumination tower 101 that may be used with a photodisruptor in a side view. The illumination tower may include a light source 100, a tower 101, an illumination beam 102, and at least one or more prisms or mirrors 103. The prism can be single or dual. In operation, light from the illumination beam 102 may be directed to the patient's eye 104.

Figure 2:
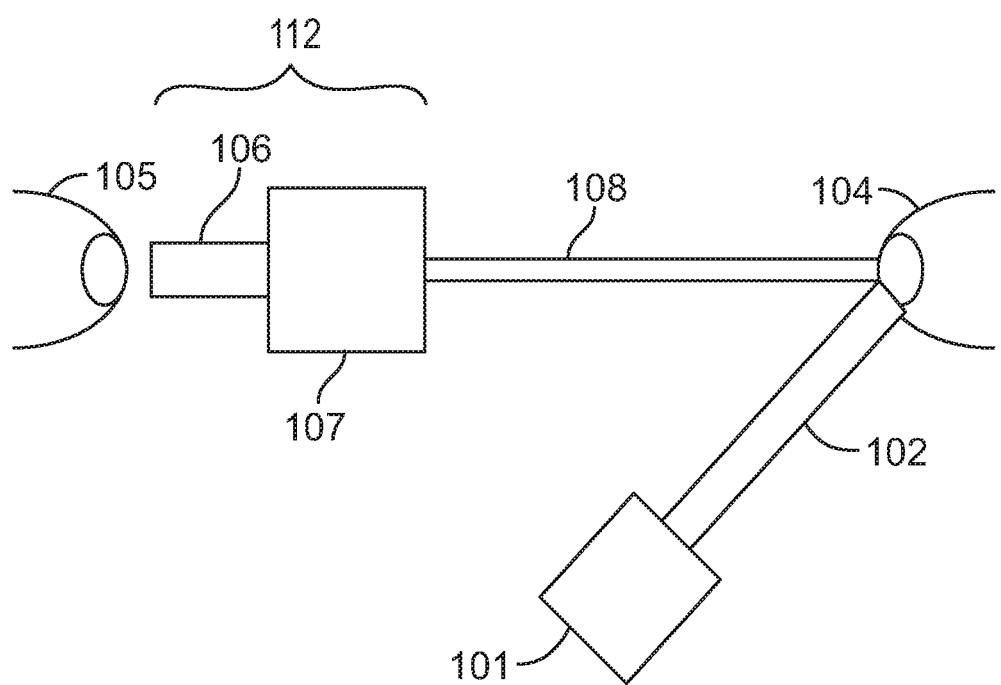
FIG. 2 is a top plan view of a photodisruptor and an illumination tower in an off-axis position adjusted manually.

FIG. 2 shows a top view of the tower 101 and a photodisruptor 112 with the illumination tower 101 in an off-axis position. The tower 101 may include an illumination beam 102, and the photodisruptor 112 may include a laser cavity 106, as well as a binoculars 107 for use of the operator. The eye of the patient 104 and the operator's eye 105 are along a first axis along the axis of the treatment beam 108. Light form the illumination beam 102 may be projected onto the patient's eye 104.

Figure 3:
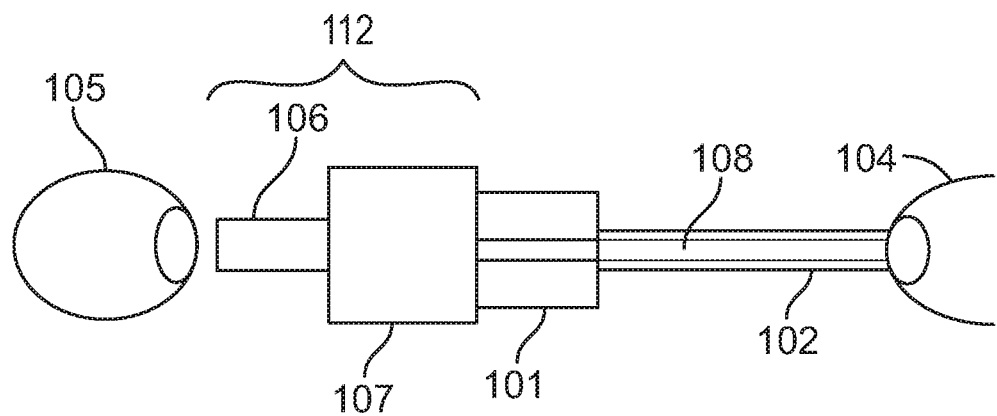
FIG. 3 is a top plan view of a photodisruptor and an illumination tower in an on-axis position adjusted manually.

FIG. 3 is a top view of the tower 101 and a photodisruptor 112 with the illumination tower in an on-axis position. In this position, light from the illumination tower and light from the photodisruptor may be along the same axis. The tower 101 illuminates the patent's eye 104 with illumination beam 102. The operator's eye 105 is positioned at binoculars 107 to observe the patent's eye 104. The photodisruptor 112 may include a laser cavity 106 which may be operated to direct a treatment beam 108 at the patient's eye 104.

Figure 4:
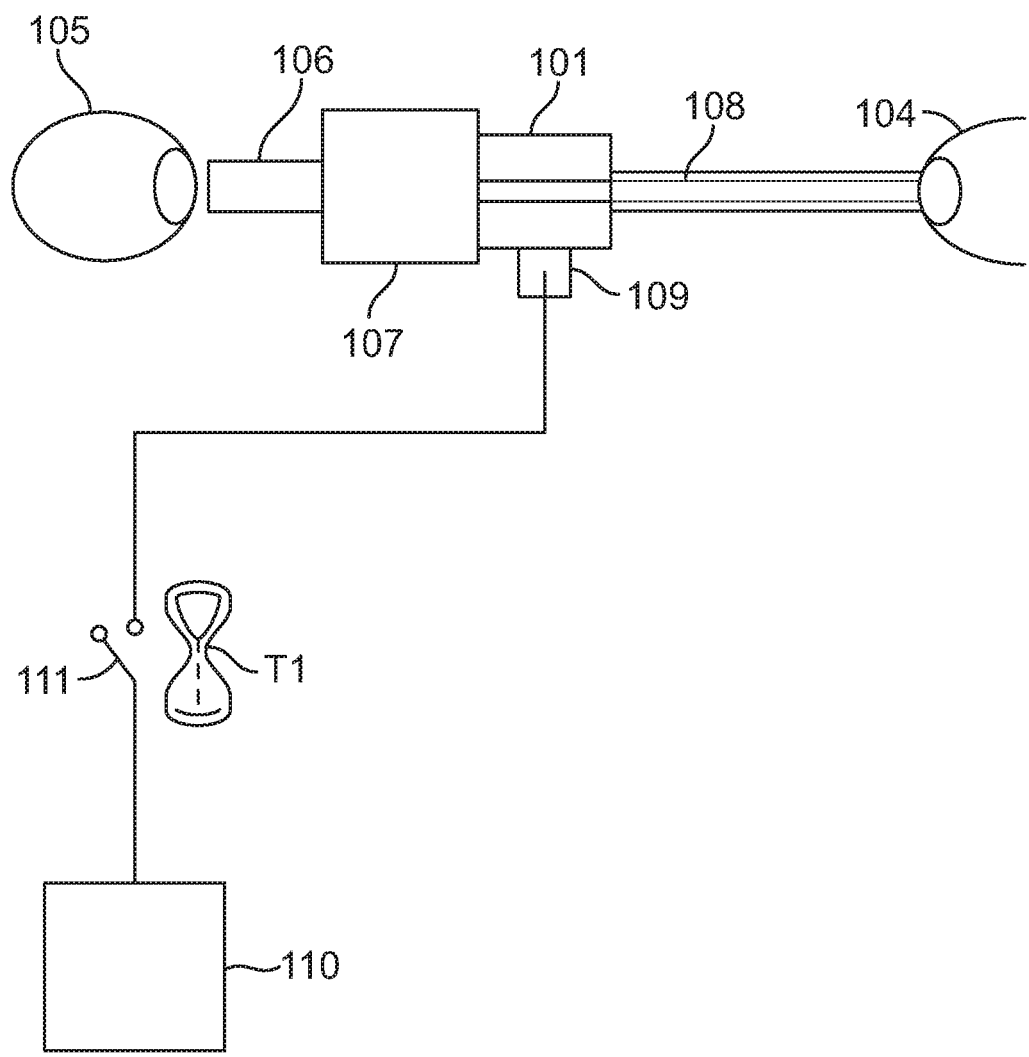
FIG. 4 is a block diagram of the device of FIG. 3 with a switch open at time T1 with the illumination tower in an on-axis position.
Figure 5:
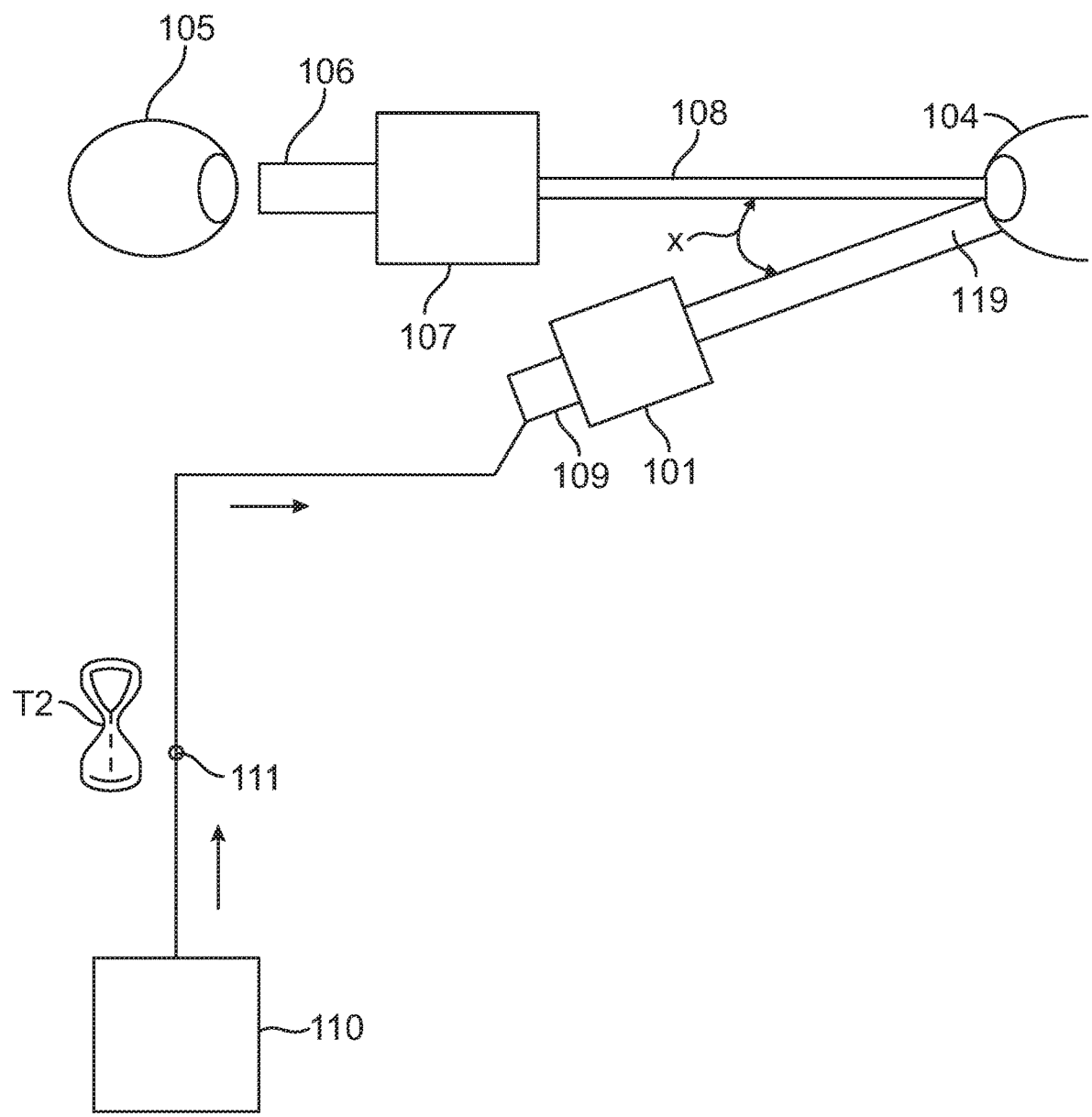
FIG. 5 is a block diagram of the device of FIG. 3 with a switch closed and the illumination tower rotated to anti-clockwise from the position in FIG. 4 at time $T_2$ from to an off-axis position.

FIG. 4. is an embodiment of FIG. 3 taken at time $T_1$. The photodisruptor 112 (see FIG. 3) is positioned along a first longitudinal axis having a laser cavity 106 and binoculars 107. The photodisruptor axis is along the first longitudinal axis between the patient's eye 104 and the operator's eyes 105. Binoculars 107 are used to observe the patient's eye 104. A treatment beam 108 is directed from laser cavity 106 along the first longitudinal axis to the patient's eye 104. The photodisruptor may have a support positioned normal to the photodisruptor's (first longitudinal) axis. The illumination tower 101 may be rotatably connected to the support. The illumination tower may include a motor 109 and switch 111. In FIG. 4 the switch 111 is shown to be in the open position, in which position the motor 109 is not engaged to move the illumination tower. A power source 110 (e.g., battery, AC, DC power source) is provided to provide power to the motor 109 to move the illumination tower when switch 111 is closed. While it is usual for the illumination tower to be rotated about an axis 119 (as shown in FIG. 5), it is to be understood that the movement may be other than rotatable. The motor maybe any type of electrically powered motor, including a servomotor that allows for fine movement of the motor rotation and thus the illumination tower, but also may include any other type of movement device, including a pneumatic control.

FIG. 5 shows the position of the illumination tower 101 at time $T_2$ after closing the switch 111. In this position, the illumination tower 101 position has been rotated anti-clockwise to a position with an oblique angle X relative to the axis of the photodisruptor from its former position as seen in FIG. 4. The switch 111 may preferably be hands free and may be a footswitch, or a voice activated switch, or any other type of switch, including a head movement or eye movement detection switch or even special glasses that detect head movement.

Figure 6:
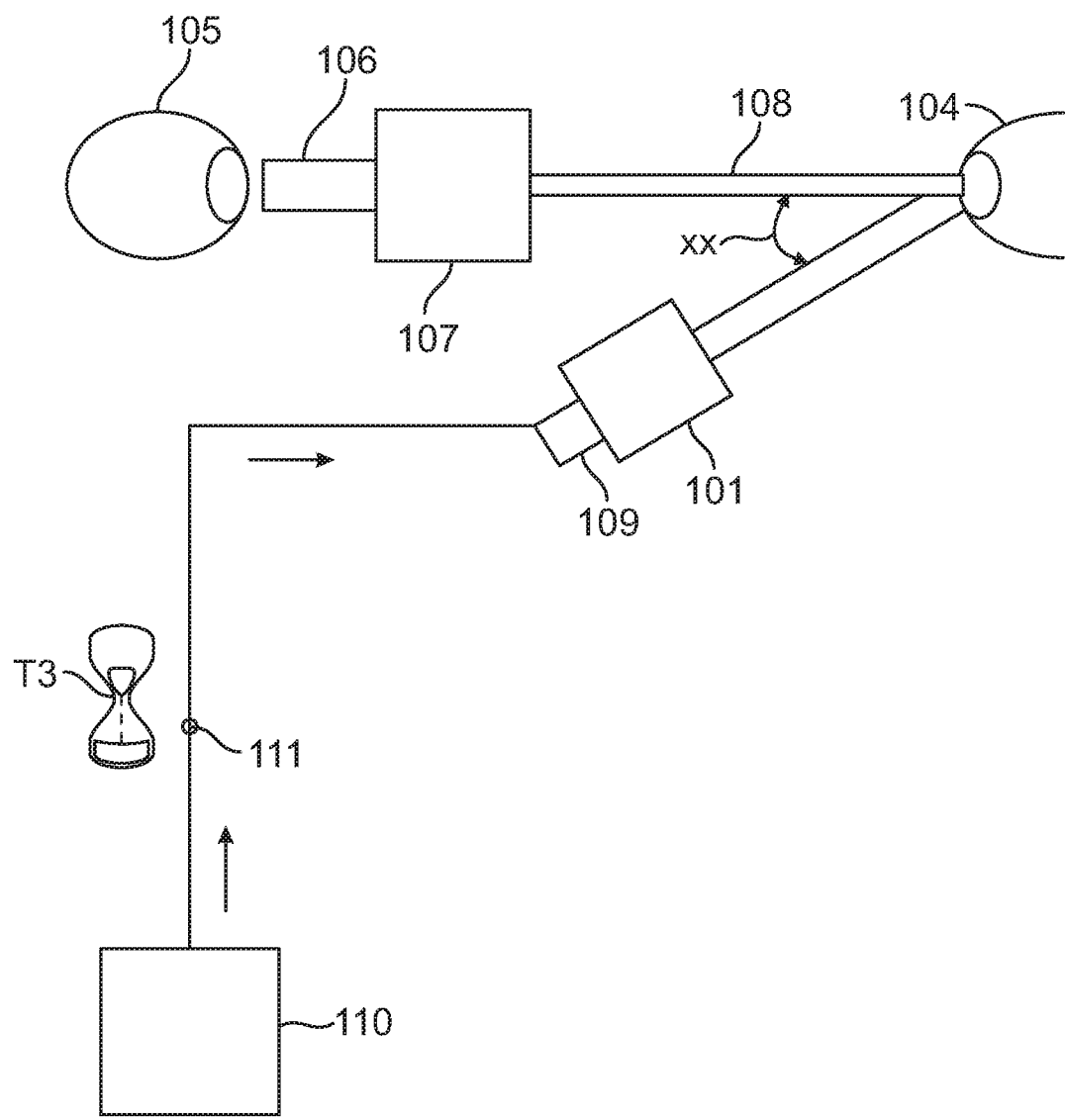
FIG. 6 is a block diagram of the device of FIG. 3 with a switch closed and further moved in an anti-clockwise rotation from the position in FIG. 5.

FIG. 6 shows the illumination tower at time $T_3$ after closing the switch 111, in which current directed to the motor 109 from the power source 110 further rotates the illumination tower anti-clockwise position further degrees anti-clockwise to an angle XX relative to its position in FIG. 5.

Figure 7:
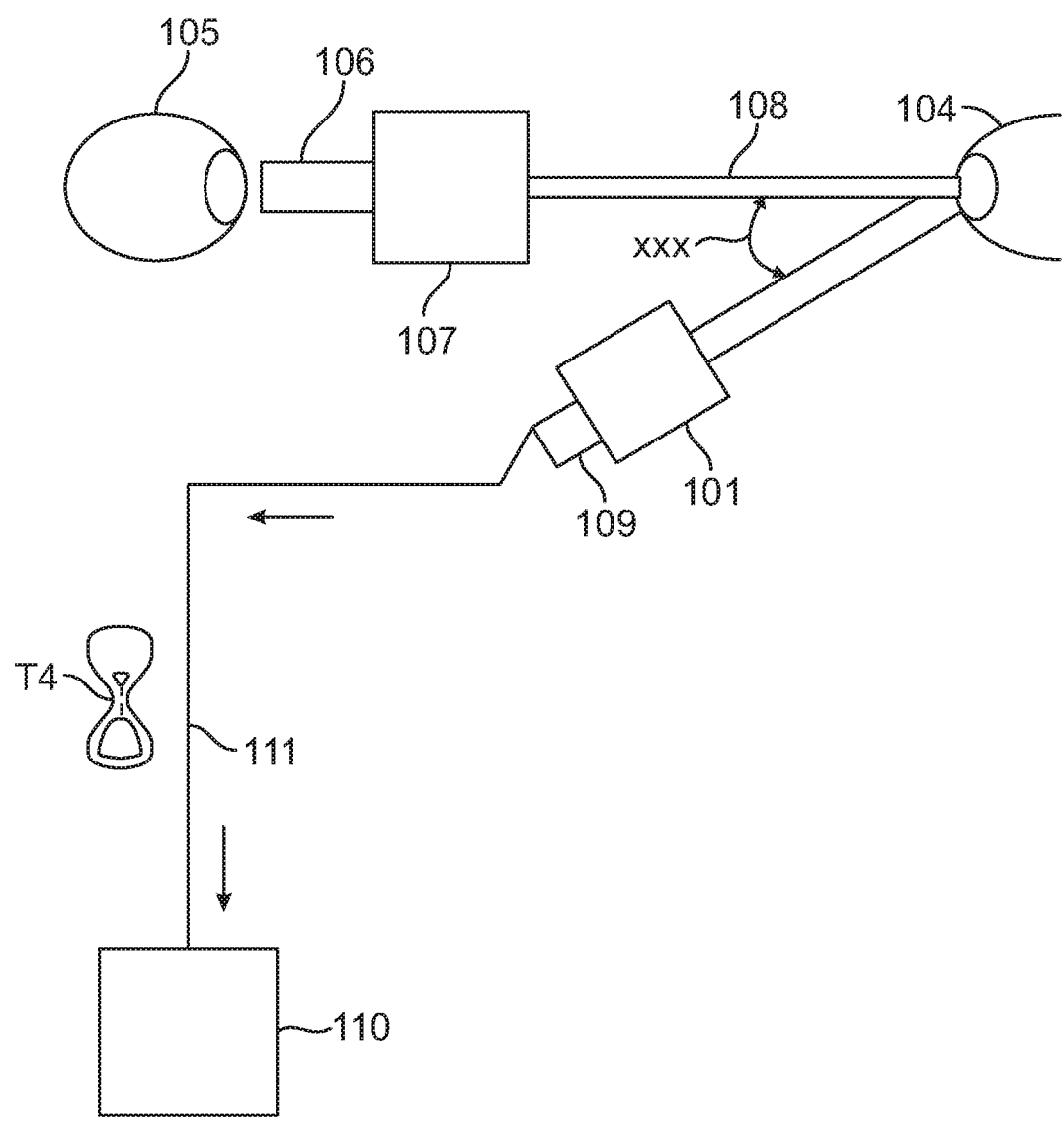
FIG. 7 is a block diagram of the device of FIG. 3 with the switch closed and the illumination tower.

FIG. 7. shows the illumination tower at time $T_4$ after closing the switch 111. In this figure, the current direction or polarity has been reversed to cause the illumination tower to move in a clockwise direction to an angle XXX, which may be the same as angle X or any other angle suitable for the operator to view the interior of the patient's eye.

The movement of the illumination tower in FIGS. 4-7 illustrates a technique by which the operator can titrate the illumination of the patient's eye without having to remove his/her attention to the target tissue by rotating the illumination tower to different positions relative to the photodisruptor.

Figure 8A:
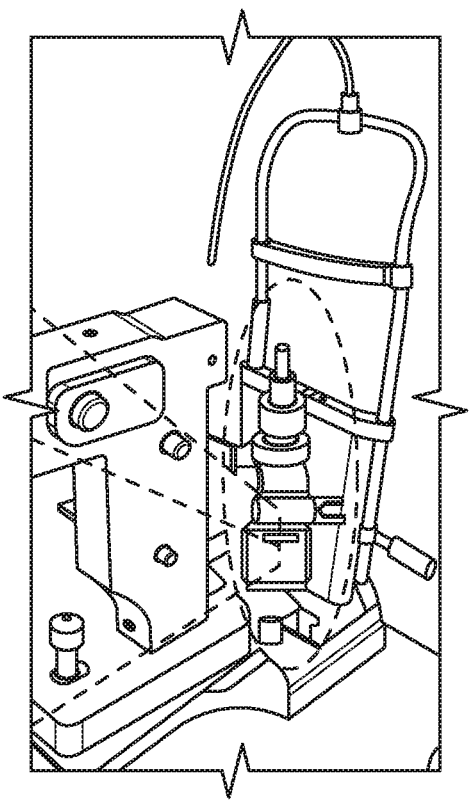
FIG. 8A is a photodisruptor and an illumination tower with a motor and switch with the illumination tower in an off-axis position.
Figure 8B:
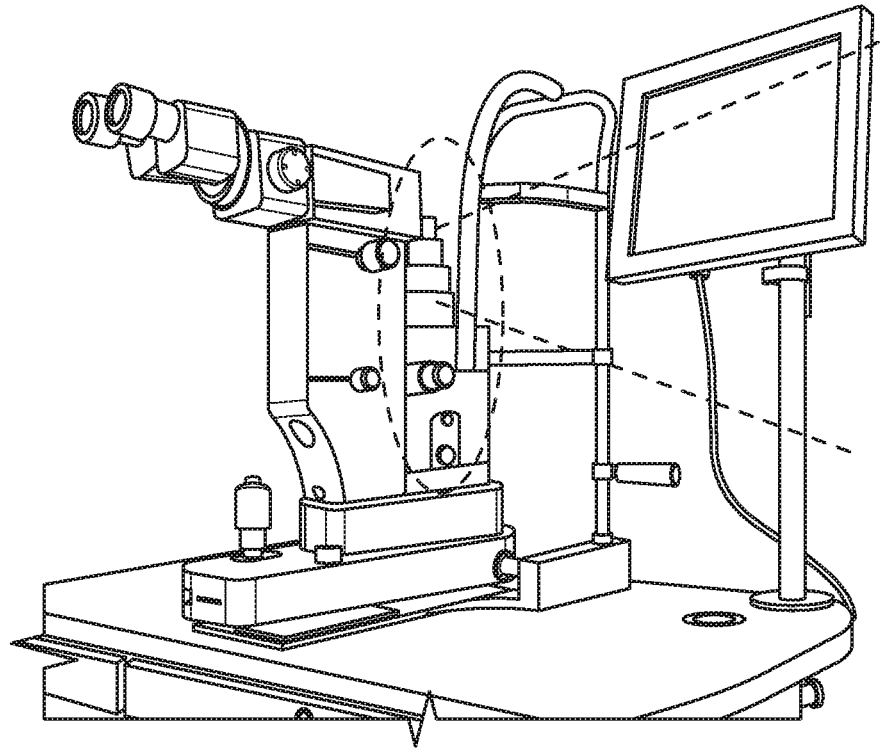
FIG. 8B is a photodisruptor and an illumination tower with a motor and switch in the on-axis position.
Figure 8C:
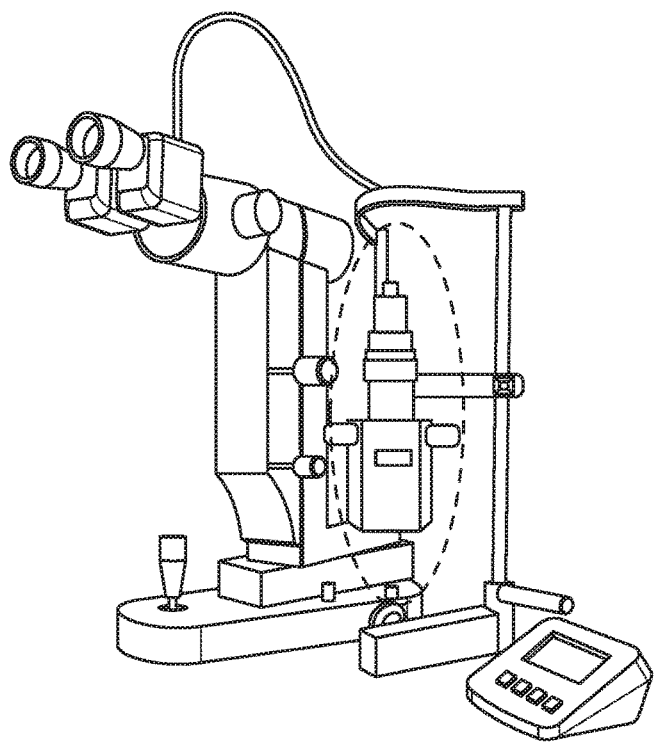
FIG. 8C is a photodisruptor and an illumination tower with a motor and switch with the illumination tower in an off-axis position.

FIGS. 8A and 8C are images showing the illumination tower in an off-axis position.

Figure 8D:
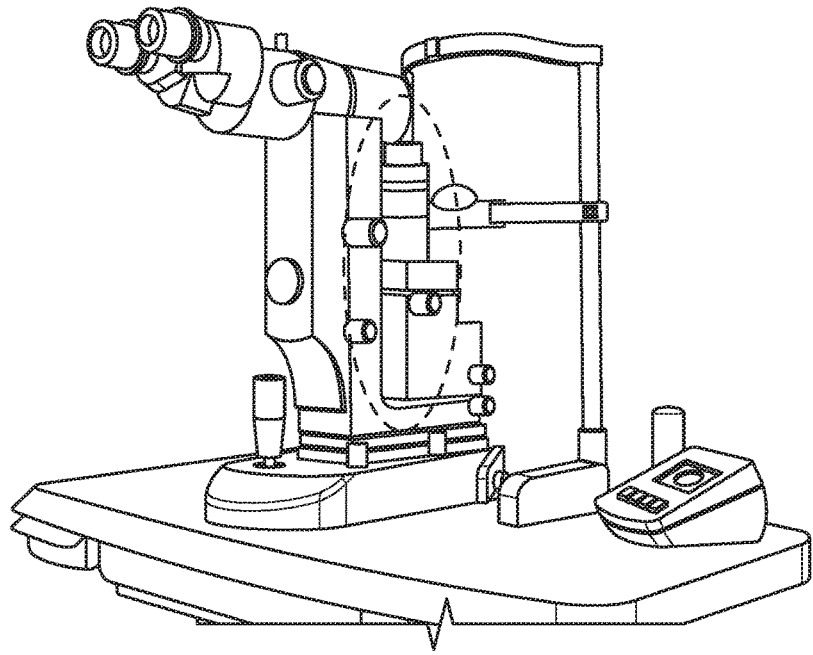
FIG. 8D is a photodisruptor and an illumination tower with a motor and switch in the on-axis position.

FIGS. 8B and 8D show the illumination tower in an on-axis position.

I claim:

1. A movable illumination tower configured for use with a photodisruptor,
   the photodisruptor having a treatment axis along which energy from a first light source within the photodisruptor is directed to a patient's eye for treatment,
   the movable illumination tower comprising:
   a second source of illumination light energy positioned within the illumination tower, the second source of illumination light energy being configured to direct illumination of the patient's eye;
   a support for the illumination tower, wherein the illumination tower is rotatably mounted along an arm of the support and configured to be moved in and out of the treatment axis; and a motor configured to operate by hands-free control to adjustably rotate the illumination tower around a rotate axis orthogonal to the treatment axis to selected angles out of the treatment axis and into the treatment axis.

2. The illumination tower of claim 1, wherein the first light source is a source of coherent light.

3. The illumination tower of claim 2, wherein the source of coherent light is a laser light source.

4. The illumination tower of claim 1, wherein the second source of light energy is a non-coherent light source.

5. The illumination tower of claim 1, wherein the hands-free motor control is one or more of a: foot pedal, a voice-activated control or a head movement control.

6. The illumination tower of claim 1, further comprising a source of power to power the motor.

7. The illumination tower of claim 1, further comprising a switch connected to the motor to control the provision of power to the motor.

8. A method of illuminating a patient's eye using the movable illumination tower of claim 1 comprising:
    viewing a patient's eye through a binoculars along the treatment axis;
    rotating around the rotate axis the illumination tower driven by the motor to a first position relative to the treatment axis by activating the hands-free control;
    viewing the illumination of patient's eye though the binoculars; and
    rotating the illumination tower around the rotate axis to one or more different positions in and out of the treatment axis using the hands-free control.

9. The method of claim 8, further comprising the step of activating and directing the first light source within the photodisruptor to the patient's eye.

* * * * *